No. 782,016.    Patented February 7, 1905.

UNITED STATES PATENT OFFICE.

SIMON FABARON, OF PARIS, FRANCE, ASSIGNOR TO PIERRE LEON PIOT, OF PARIS, FRANCE.

ALLYL-FORMALDEHYDE-ISO-SULFO-CYANATE AND PROCESS OF MAKING SAME.

SPECIFICATION forming part of Letters Patent No. 782,016, dated February 7, 1905.

Application filed June 15, 1903. Serial No. 161,487. (Specimens.)

*To all whom it may concern:*

Be it known that I, SIMON FABARON, a citizen of the Republic of France, and a resident of Paris, France, have invented an Allyl-Formaldehyde-Iso-Sulfo-Cyanate and Process of Making the Same, of which the following is a specification.

This invention relates to a process for the preparation of formaldehyde-iso-sulfo-cyanate of allyl, constituting a general sterilizer of micro-organisms of ferments or soluble ferments.

If reactions are brought about between (*a*) allylamin upon chloro-sulfid of carbon, we obtain

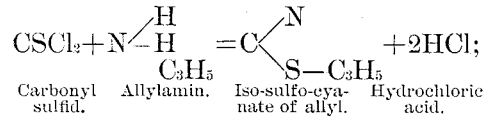

(*b*) sulfid of carbon and allylamin we obtain

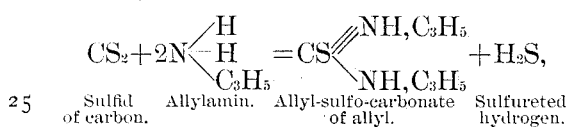

and by reduction

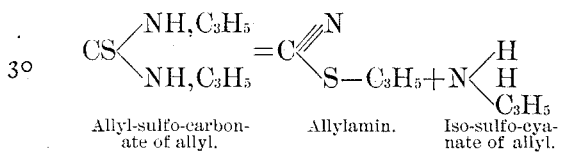

(*c*) bromid of allyl and iso-sulfo-cyanate of potassium we obtain

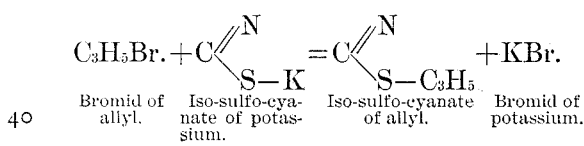

If a mixture of hydrogen and carbonic acid is submitted to the action of electric sparks, a body is formed which plays the rôle or function of aldehyde and which may be called "methanal," according to Hofmann, ("formic aldehyde" or "formenol" or "formol," according to Berthelot, or "methylal," according to Gerhardt,) and which is commonly known as "formaldehyde." The chemical formula of this aldehyde is

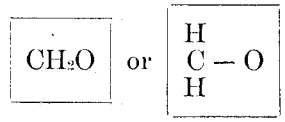

according to the reaction

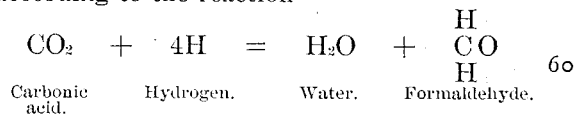

By slowly oxidating carbinol or methylic alcohol we obtain

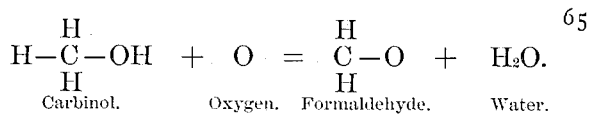

When methylenic glycol, $CH_2{<}{}^{OH}_{OH}$, is prepared, this body does not remain in a free state, owing to the instability of its molecule. It becomes dehydrated in forming formaldehyde, which is its anhydrid, but which trebles its molecule $3(CH_2O)$ or $C_3H_6O_3$, the body name trioxymethylene.

Methylal in the form of trimethylal or of formaldehyde attacks glycerin, $C_3H_5{<}{}^{OH}_{OH}{}^{OH}$ at the temperature of about 200° centigrade, causes it to lose a molecule of water and, not being a saturated body, gives glyceric formaldehyde, which has not, as far as I am aware, yet been mentioned by any writer.

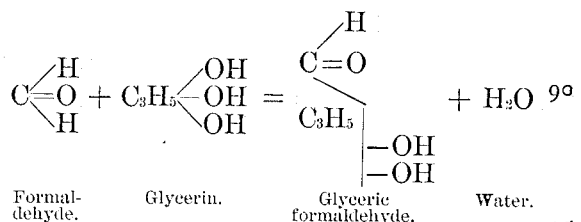

This novel reaction is one of the bases of the improved process herein described. Glyceric formaldehyde may in presence of the elements of water regenerate by inverse reaction glycerin and formaldehyde or triformaldehyde.

Aldehydes under special conditions give, with hydracids, ether-alchohols. Thus formaldehyde gives, with cyanhydric acid and sulfo-cyanhydric acid, the following cyanhydrins:

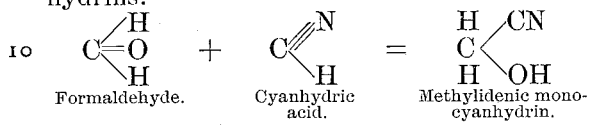

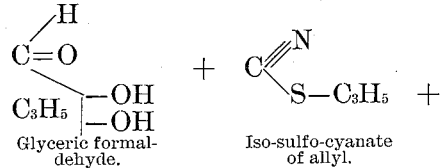

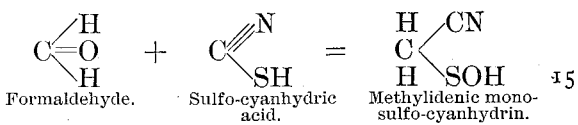

Glyceric formaldehyde solely in the presence of glycerin and of the elements of water and at a temperature bordering on dissociation makes the double decompositions with the ethers of sulfo-cyanhydric acid, regenerating the glycerin, which recuperates the elements of water.

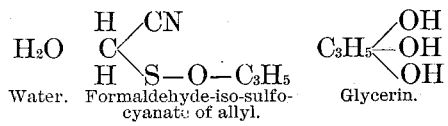

The process for the manufacture of formaldehyde-iso-sulfo-cyanate of allyl is as follows: In a suitable vessel there is heated to about 190° centigrade or more, if necessary, one kilogram of glycerin, to which is added about five grams of iso-sulfo-cyanate of allyl, and the absorption of a current of formaldehyde is caused up to the point where absorption ceases. The reactions take place in the manner indicated above, and the operation is arrested when the weight of fourteen hundred grams is reached. Cooling is then allowed to take place and is followed by filtering through paper. The product obtained may be employed either pure or diluted in all appropriate vehicles, such as glycerins, aldehydes, alcohols, acids, ammonias, ethers, water, and the like or any mixture of these vehicles.

Formaldehyde-iso-sulfo-cyanate of allyl is soluble in water, glycerin, aldehydes, alcohol, acids, ammonia, ether, or mixtures of these vehicles. It boils at about 200° centigrade and has a clear yellow color, darkening in the light or when exposed to the air. It does not, so far as known, crystallize under any conditions.

Formaldehyde-iso-sulfo-cyanate of allyl is a sterilizer and an antiferment. It may be employed for arresting all fermentation and destroying all micro-organisms of ferments or soluble ferments without exception, whether they belong to the vegetable or animal kingdom, cellules or liquids, organic or inorganic, such as mushrooms, molds, yeasts, bacteria, neuro-epithelial cellules, vibrions, pepsins, pancreatins, maltins, virus serums, suppurations, and the like, (saccharomyces cerviside, penicillium glaucum, coccus pyogenes aureus, micrococcus, ureæ, sarcin, and the like.)

I claim as my invention—

1. The herein-described process of producing formaldehyde-iso-sulfo-cyanate of allyl, said process consisting in causing formaldehyde to react upon glycerin and iso-sulfo-cyanate of allyl.

2. The herein-described process of producing formaldehyde-iso-sulfo-cyanate of allyl, said process consisting in causing formaldehyde to react upon glycerin and iso-sulfo-cyanate of allyl under heat.

3. As a new product, the herein-described sterilizer and antiferment, consisting of formaldehyde-iso-sulfo-cyanate of allyl and having the formula:

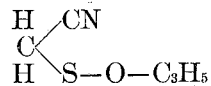

and soluble in water, glycerin, aldehydes, acids, ammonia, ether, or their mixtures, boiling at about 200° centigrade, and of a light yellow color, darkening on exposure to light or air.

In testimony whereof I have signed my name to this specification in the presence of two subscribing witnesses.

SIMON FABARON. [L. s.]

Witnesses:
 LÉON FRANCKEN,
 J. ALLISON BOWEN.